(12) United States Patent
Karlsson

(10) Patent No.: US 9,332,545 B2
(45) Date of Patent: May 3, 2016

(54) METHOD AND SYSTEM FOR OPTIMIZING THE EFFICIENCY OF SIGINT COLLECTION SYSTEMS ON MOBILE PLATFORMS WITH LIMITED BANDWIDTH CONNECTIONS

(71) Applicant: Lars Karlsson, Santa Clara, CA (US)

(72) Inventor: Lars Karlsson, Santa Clara, CA (US)

(73) Assignee: Spectranetix, Inc., Santa Clara, CA (US)

( * ) Notice: Subject to any disclaimer, the term of this patent is extended or adjusted under 35 U.S.C. 154(b) by 81 days.

(21) Appl. No.: 14/099,055

(22) Filed: Dec. 6, 2013

(65) Prior Publication Data

US 2015/0163804 A1 Jun. 11, 2015

(51) Int. Cl.
| | |
|---|---|
| *H04J 1/00* | (2006.01) |
| *H04W 4/00* | (2009.01) |
| *H04W 72/04* | (2009.01) |
| *H04L 1/18* | (2006.01) |
| *H04W 72/10* | (2009.01) |
| *H04L 1/00* | (2006.01) |
| *H04W 28/18* | (2009.01) |

(52) U.S. Cl.
CPC ......... *H04W 72/0453* (2013.01); *H04L 1/0002* (2013.01); *H04L 1/1861* (2013.01); *H04L 1/1893* (2013.01); *H04W 28/18* (2013.01); *H04W 72/0446* (2013.01); *H04W 72/10* (2013.01)

(58) Field of Classification Search
None
See application file for complete search history.

(56) References Cited

U.S. PATENT DOCUMENTS

| 7,539,275 | B2 * | 5/2009 | Ray ................................ 375/349 |
| 7,869,785 | B2 * | 1/2011 | Karlsson ....................... 455/334 |
| 7,876,869 | B1 * | 1/2011 | Gupta ............................ 375/350 |
| 8,508,395 | B2 * | 8/2013 | Song ............................. 341/131 |
| 8,582,694 | B2 * | 11/2013 | Velazquez et al. ............ 375/340 |
| 2005/0152487 | A1 * | 7/2005 | Reichard ....................... 375/350 |
| 2010/0159866 | A1 * | 6/2010 | Fudge et al. .................. 455/302 |

* cited by examiner

*Primary Examiner* — Chi H Pham
*Assistant Examiner* — Soon-Dong D Hyun
(74) *Attorney, Agent, or Firm* — Steins & Associates, P.C.

(57) ABSTRACT

A Method and System For Optimizing The Efficiency of SIGINT Collection Systems on Mobile Platforms with Limited Bandwidth Connections that is implementable in legacy signal collection systems. The resultant system first reduces potential upload bandwidth by eliminating whitespace in collected signals. Next, the system ignores collectable signals based on signals frequency or angle of arrival so as to identify energy of interest. Next, the system score and attributes a priority to each energy of interest, now known as signals of interest. The system then increases collection bandwidth on all signals of interest based on the score, priority and availability of resources. Finally, in real time, and based on SOI score and priority and the availability of downlink resources, the collected signal data is downlinked to the SIGINT control center.

12 Claims, 4 Drawing Sheets

METHOD AND SYSTEM FOR OPTIMIZING THE EFFICIENCY OF SIGINT COLLECTION SYSTEMS ON MOBILE PLATFORMS WITH LIMITED BANDWIDTH CONNECTIONS

This application is filed within one year of, and claims priority to Provisional Application Ser. No. 61/734,590, filed Dec. 7, 2012.

BACKGROUND OF THE INVENTION

1. Field of the Invention

This invention relates generally to Wireless Signal Collection Systems and, more specifically, to a Method and System For Optimizing The Efficiency of SIGINT Collection Systems on Mobile Platforms with Limited Bandwidth Connections.

2. Description of Related Art

Over recent years, Government and Military mobile (air or ground-based) signals intelligence (SIGINT) platforms have increasingly had to deal with more and more challenges. These challenges include denser signal environments, wider frequency range targets, frequency-hopping targets, and even communications signals appearing on traditional microwave frequency bands (frequency ranges formerly only used only for radar type signals). These increased challenges have resulted in increasing the raw output of existing SIGINT collection systems to the point where it is now infeasible to send back the resulting large amounts of data in real time for control/command center processing.

The air-ground, or ground-air-ground links used to link the mobile platforms to the control/command centers have limited wireless communications bandwidths. Furthermore, due to the cost and complexity, it is impractical to increase these bandwidths. Thus, in order to keep up with changing RF environments, vast increases in the efficiency of the SIGINT collection techniques are needed More advanced approaches must be researched and adopted to increase the efficiency of SIGINT collection. Clear innovations and next generation advancements in DSP, wideband digital scanning, high speed processing and datastream optimization algorithms are required to handle these modern challenges.

What is needed is a method and system to automatically adjust to varying bandwidth downlinks. The data throughput restrictions will be dealt with by adaptively prioritizing (and then throttling) the collected SIGINT datastreams to match the maximum allowable bandwidth at any moment, in real-time. This will completely maximize the mobile platform's downlink capability, no matter what the available bandwidth is. It will create SIGINT platform efficiencies heretofore not experienced and would extend the lifespan of the existing fleet of signals intelligence gathering aircraft/vehicles/ships. What is needed are unique approaches, unique techniques and algorithms for SIGINT platforms that can allow them to: automatically scan the RF spectrum with extreme speed, ignore whitespace regions, automatically focus and filter signals, and to have advanced signal-of-interest (SOI) prioritization algorithms based on real-time feedback from the datalink subsystem. Such a digital signal processing system would thus create far richer collected datasets.

SUMMARY OF THE INVENTION

In light of the aforementioned problems associated with the prior devices, methods and systems, it is an object of the present invention to provide a Method and System For Optimizing The Efficiency of SIGINT Collection Systems on Mobile Platforms with Limited Bandwidth Connections. In order to optimize the data uplink efficacy of the conventional mobile signal intelligence collection, the system and method should be implementable in legacy signal collection systems. The resultant system should first reduce potential upload bandwidth by eliminating whitespace in collected signals. Next, the system should ignore collectable signals based on signals frequency or angle of arrival so as to identify energy of interest. Next, the system should score and attribute a priority to each energy of interest, now known as signals of interest. The system should then increase collection bandwidth on all signals of interest based on the score, priority and availability of resources. Finally, in real time, and based on SOI score and priority and the availability of downlink resources, the collected signal data should be downlinked to the SIGINTcontrol center. The system must automatically and adaptively reduce the demands on the mobile links. The invention described in this patent application answers all these needs while at the same time having minimal operations & maintenance costs, and being scalable (i.e. can be mounted on a variety of mobile platforms such as all ground vehicles, ships, large airframes, aircraft pods, and even UAV's). The system and method described herein will allow unprecedented airborne/shipborne/& vehicular SIGINT collection that will increase performance and ultimately reduce costs for the U.S. Government.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Method and System For Optimizing The Efficiency of SIGINT Collection Systems on Mobile Platforms with Limited Bandwidth Connections.

Figure 1:
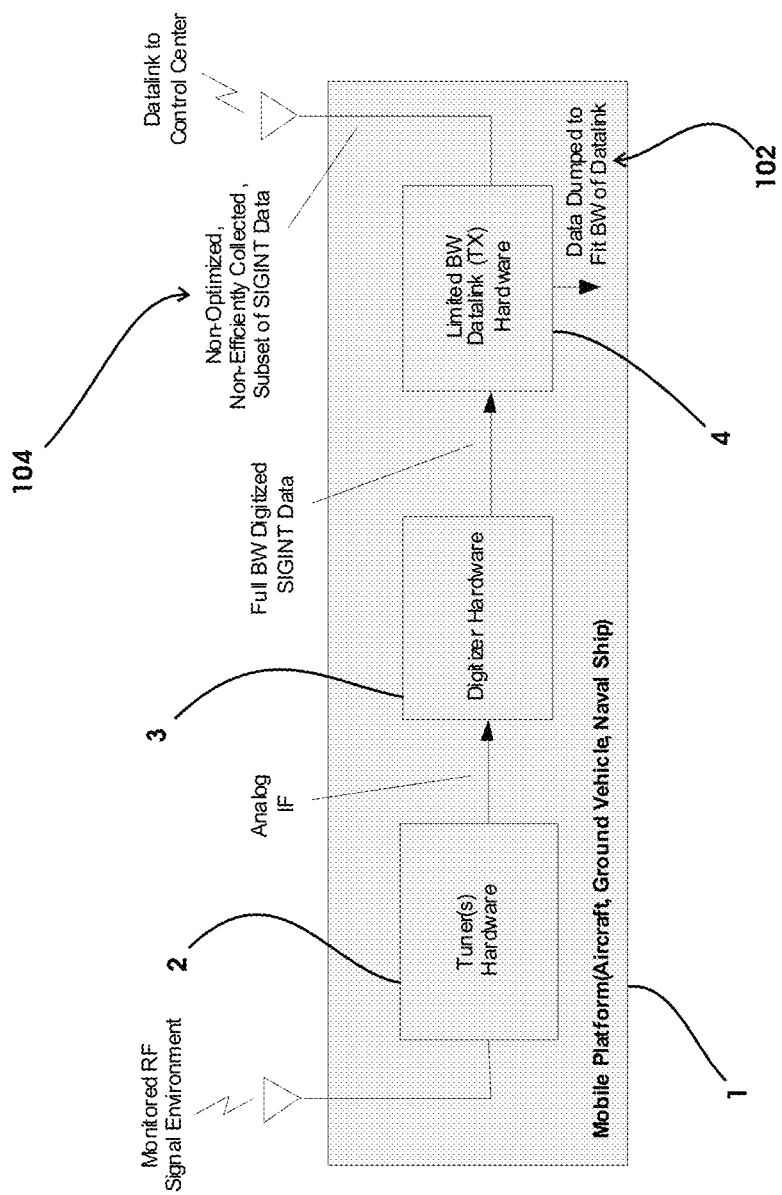
FIG. 1 is a block diagram of a conventional mobile SIGINT collection system.

FIG. 1 shows the prior art system. Signals are received by the standard SIGINT system tuner(s) 2. The analog IF output is then sent to a standard digitizer (i.e. A/D converter) 3. Typically, this digitizer is followed by a DSP chipset or FPGA subsystem. The subsystem digitizes and then processes the data so it can be sent to the Datalink subsystem 4. The data that is sent to the Datalink subsystem is non-optimized, large blocks of digital SIGINT data. But the datalink subsystems always have some bandwidth limitation whereby only certain amounts of data can be transmitted reliable. What happens in the case of downlink overload is that SIGINT data blocks must be dumped 102 so that gaps are created in the data transmitted downstream. Sometimes this dumped data is stored locally, but not always. In any case, the SIGINT collection operation is non-optimized.

Figure 2:
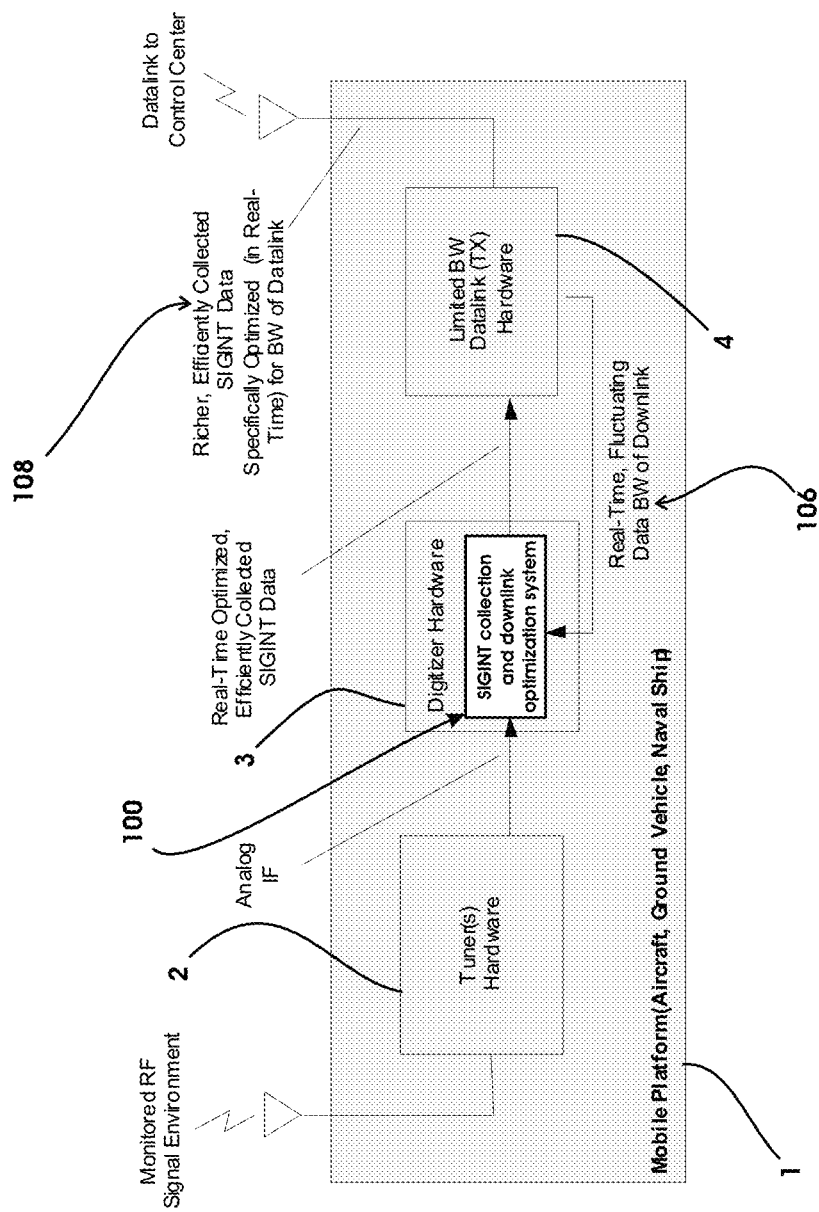
FIG. 2 is a block diagram of the system of FIG. 1 having the method and system of the present invention implemented therein.

FIG. 2 outlines the Invention as described herein. As can be seen, the Invention 100 is software/firmware based. It places a unique set of algorithms into the standardized Digitizer Hardware 3, such that they run in serial with the conventional digitizer processes. A telemetry output 106 of the Datalink subsystem is taken, which tells in real-time what the present allowable BW of the downlink is. This number is then feed back into the algorithms of the Invention 100, thereby helping to optimize the entire process.

Figure 3:
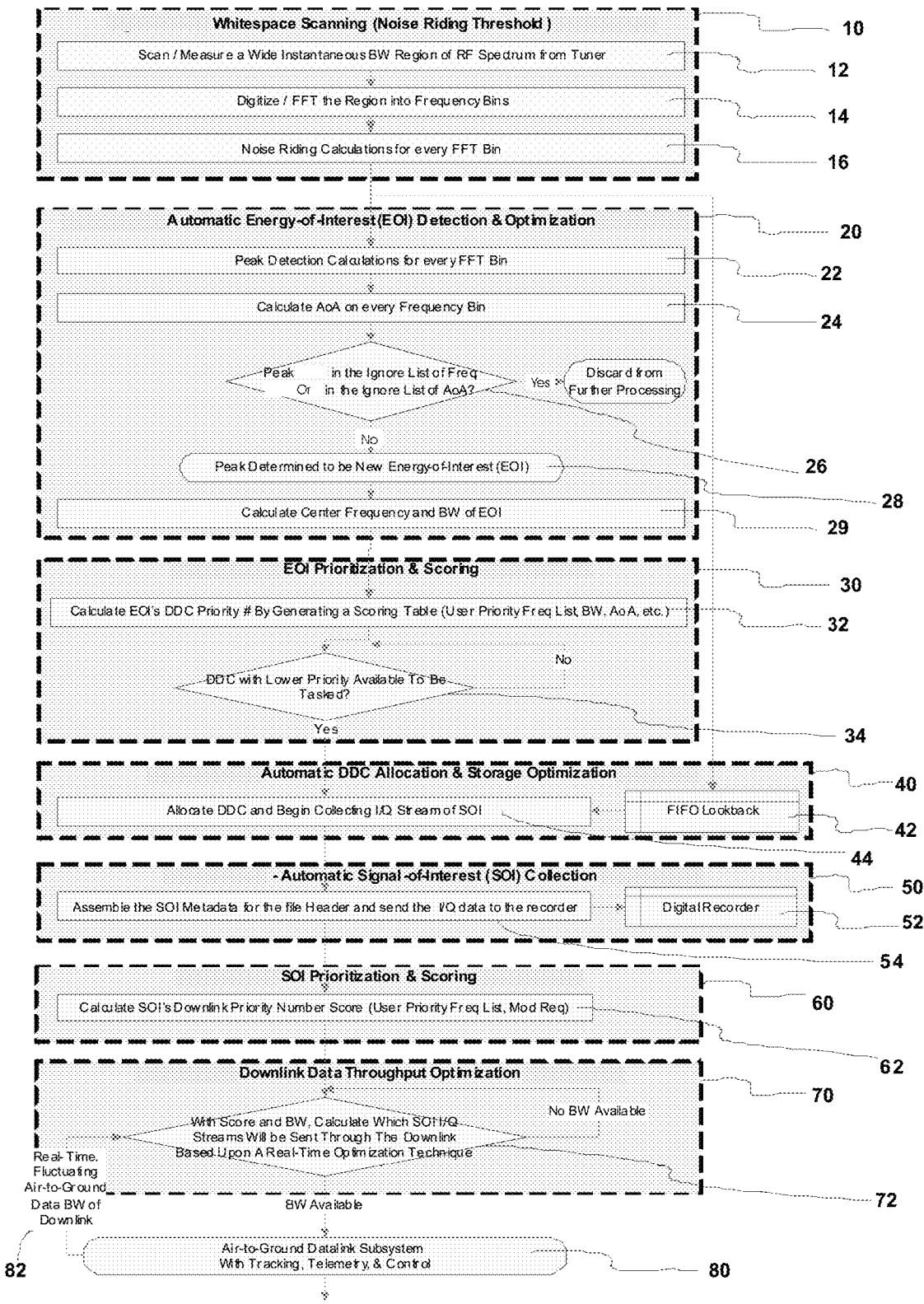
FIG. 3 is a flowchart describing the steps of the preferred optimized collection and reporting system of the present invention.

FIG. 3 outlines the signal block diagram of the Invention. The algorithms for high efficiency collection and optimization are shown in detail.

Figure 4:
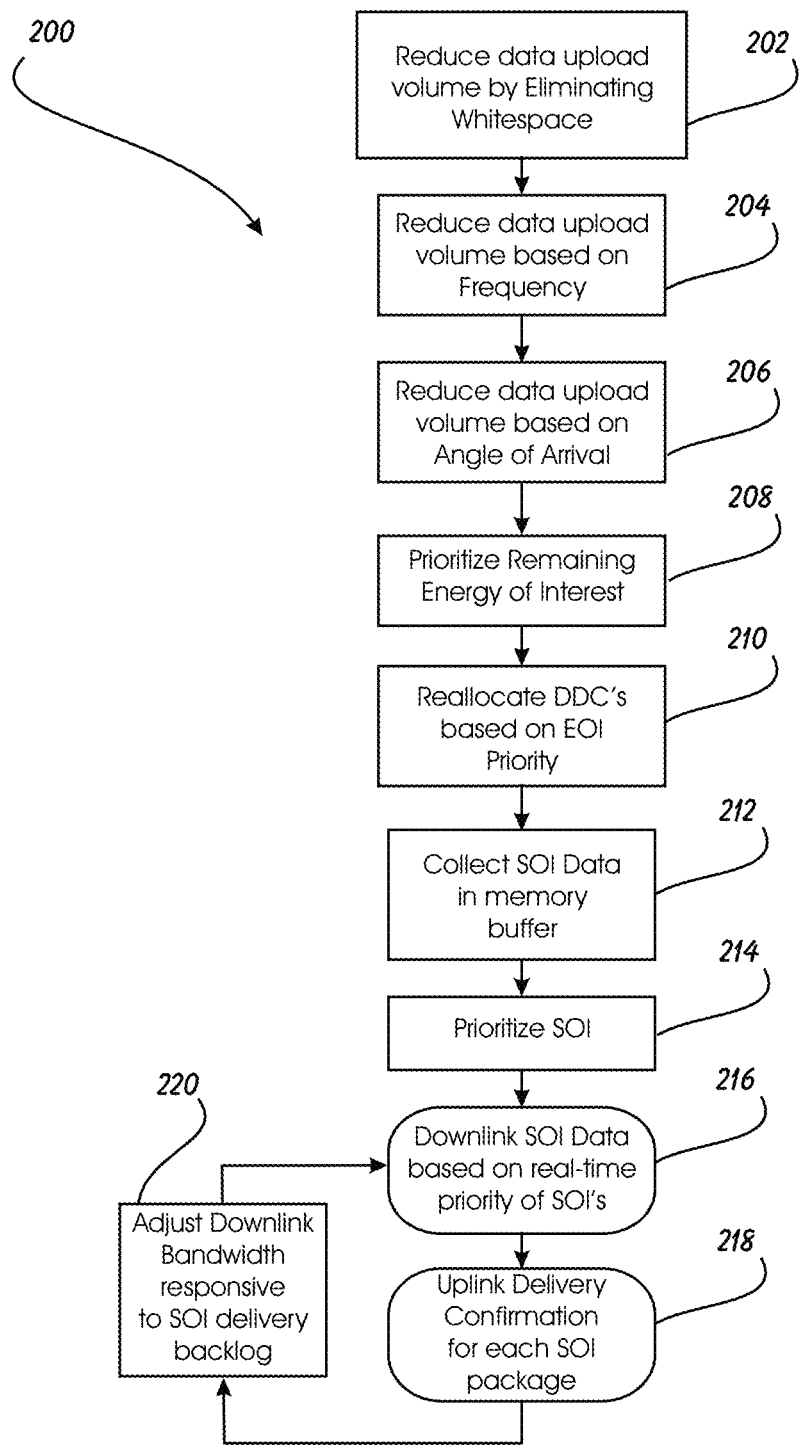
FIG. 4 is a flowchart summarizing the steps of the system of FIG. 3.

FIG. 4 describes the optimization method of the present invention in terms of operational steps that are non-specific as to the specific hardware conducting the steps.

Operation

Current SIGINT platforms perform brute force collection processes. The total amount of data that can potentially be collected cannot possibly be transmitted by the downlink due to limited realistic bandwidths. The following sections provide a summary of the technical approaches & techniques of this Invention intended to create a reliable real time Signal of Interest (SOI) collection system.

1) Perform High Efficiency Scanning, Detection, and Identification of SOI's: The algorithms to Scan, Detect, and Identify SOI's consist of a number of DSP routines implemented in HDL code. In order to process the incoming frequency spectrum the tuners analog IF is first digitized by an A/D converter. The resulting data stream is then timestamped and split up in small frequency segments (bins) with help of an FFT. Every bin will only at most cover a few KHz in order to maintain good frequency resolution and high sensitivity. The bin data is then processed first by an algorithm that automatically calculates and stores the noise floor for every bin. This noise floor then provides the basic reference point (i.e. threshold) for the triggering of the next algorithm that detects any and all peaks in the spectrum. At the same time, the bandwidth of any new detected energy is calculated from the peak information, and is reported to an algorithm that allocates digital drop converters (DDC's). A label is then created containing all the detected characteristics of the new energy. Together with the additional information (such as a priority frequency list), a score is then calculated and used as an item to compare priority for the further recordings and downlink bandwidth allocations.

2) Perform High Efficiency Filtering of SOI's: For every SIGINT system there is a pool of Digital Down Converters (DDC's). Every DDC consists of a Numeric Controlled Oscillator to tune the DDC to the desired IF frequency, and in addition contains down samplers and filters that can be set to all bandwidths of interest. All the DDC functions are implemented in HDL code. When in use, every DDC has a priority score allocated with its task. In the case where all DDC's are already in use, this priority score is compared with any newly detected Energy-of-Interest (EOI).

3) Perform High Efficiency Techniques to Minimize Collected I/Q of SOI's: In order to not waste downlink and recording bandwidth, it is important to accurately allocate the required bandwidth for a new EOI. This is accomplished by observing the actual occupied bandwidth and then adding an additional amount to that. When the decision is made regarding the correct bandwidth, the input to the DDC is switched to a lookback memory that allows capture of the new SOI from the first moment the new energy was detected. The lookback memory is normally about 2 or more seconds long so that there is plenty of time to for the system to observe the signals before the decisions need to be made about what DDC bandwidth should be allocated. This lookback observation is conducted without losing any of the information from the SOI. The DDC bandwidth is then set and the I/Q stream from the DDC is recorded on a digital recorder. This recorder is normally constructed with a number of solid state drives or conventional disk drives of sufficient size to record a complete mission.

4) Perform High Efficiency Techniques to Prioritize and Throttle Downlink Streams: Some SOI's must be immediately sent down to operators, generally because they are emanating from suspected enemy forces. Therefore, in addition to being recorded, the I/Q stream or the demodulated audio together with meta data (such as center frequency and occupied DDC channel bandwidth) can be transmitted over a downlink. In order to manage the bandwidth of the downlink an additional set of priorities such as frequencies of special interest are calculated and compared with the already ongoing data channels on the downlink.

The priorities of the actual SOI's on a downlink channel can be changed by an operator at any time. If an operator decides that the content of a channel is not of real interest, then he can manually free up the downlink channel space. In addition to the selected DDC's I/Q data, the downlink also contains all the frequency bins that are scanned during the search for new energy. In order to conserve downlink bandwidth, all white space is first removed, and the update rate is reduced to a few times per second. The update rate can be set by the operators. Channels on the downlink or SOI's currently recorded are marked in different colors. Also, the local operator display unit can be made to display a waterfall depicting any part of the spectrum. This gives a picture of the entire frequency spectrum.

DETAILED DESCRIPTION

The system and method [100] will yield high efficiency scanning, detection, and optimization of the data downlinks for airborne SIGINT applications. The precise methods included in the Invention [100] are split into seven (7) distinct sub-processes:

Sub-process #1—Whitespace Scanning (Noise Riding Threshold) Algorithm

Sub-process #2—Automatic Energy-of-Interest (EOI) Detection & Optimization Algorithm Sub-process #3—EOI Prioritization & Scoring Algorithm Sub-process #4—Automatic DDC Allocation & Storage Optimization Algorithm Sub-process #5—Automatic Signal-of-Interest (SOI) Algorithm Sub-process #6—SOI Prioritization & Scoring Algorithm Sub-process #7—Downlink Data Throughput Optimization Algorithm FIG. 3 shows a detailed block diagram showing where the sub-processes will be placed on any generic SIGINT collection platform. The algorithms of the sub-processes will allow the conventional platform to drastically increase SIGINT collection efficiency, and optimize its' output to a data downlink so that it does not exceed the bandwidth requirements of the air-ground, ground-air, or ground-air-ground links.

Sub-process #1—Whitespace Scanning (Noise Riding Threshold) Sub-process 10: This algorithm begins by scanning a wide instantaneous bandwidth region of RF spectrum output from a tuner 12 (or tuners). Alternatively, the tuners can be Direction Finding receiver(s). It then digitizes and performs Fast Fourier Transformations of that region into frequency bins 14. The Algorithm then continuously performs noise riding calculations on every single frequency bin 16. In this way, a noise threshold can be automatically or manually set so that, for example, only signals that appear at several dB above the noise floor trigger the collection. This greatly enhances the system's ability to sort out the unwanted signals and focus all collection on areas of the RF spectrum where there is traffic. Right away this algorithm will eliminate all white space and help to enhance the collection efficiency of the system.

Sub-process #2—Automatic Energy-of-Interest (EOI) Detection & Optimization Sub-process 20: This algorithm inspects every bin in the received IBW and compares the level with the current noise floor, such a subprocess is called the Peak Detection Calculation 22. After that is done, the angle of arrival (AoA) is calculated for every frequency bin 24. Then a decision point is made, if the peak is part of a list of pre-determined frequencies to ignore, or pre-determined AoA's to ignore 26. If either of those criterions are met, the signal is discarded from further processing. If the signal level meets the trigger criteria it will be noted as an Energy-of-Interest (EOI) 28. The Line of Bearing (LoB) of the new energy is also noted. The center frequency is then calculated for the EOI and the BW measurement made 29.

At the same time a time the data comes through the Sub-process #2, an averaged picture of the entire spectrum with the current bin spacing is generated and stored into a FIFO 42 which is also used in Sub-process #4. Because of the large sampling reduction made on the spectrum this will require very little storage space. Any part or the entire spectrum picture can also be sent down to the operators at any time.

Sub-process #3—EOI Prioritization & Scoring Sub-process 30: This algorithm assigns a score to all new EOI 32. This score is formed by mission tables containing frequency ranges of high interest, low interest, or no interest. Occupied bandwidth is calculated and the LoB of the EOI can also be part of the priority scoring.

Sub-process #4—Automatic DDC Allocation & Storage Optimization Sub-process 40: This algorithm maintains control over allocation of DDC resources. If free DDC channels are available it will assign and set a DDC at the center frequency of the new energy and allocate a bandwidth covering twice the measured bandwidth of the EOI. Collection of the I/Q stream of the Signal-of-Interest (SOI) 44 then commences. If no DDC channels are available it will compare the priority score of the EOI with the score of all the already allocated DDC channels. If a lower scored channel is found it will be replaced by the new EOI. A log is maintained for all new EOI events that can later be analyzed for further enhancements of the priority criteria's.

Sub-process #5—Automatic Signal-of-Interest (SOI) Collection Sub-process 50: The SOI data is then assembled with metadata 54. The I/Q from the DDC channels together with all metadata like Frequency, BW, LoB and time stamps are forwarded to a recording pool 52 that contains a bank of solid state or convention disk media without requiring any operator intervention. The data to the DDC is fetched from a FIFO look back memory 42 so no part of the new signals information is missed because of decision processing time.

Sub-process #6—SOI Prioritization & Scoring Sub-process 60: SOI's occurring at frequency ranges of high interest or with other attributes of interest are considered for instant down streaming to the operators. Those SOI's are allocated an additional score that are used for the downlink prioritization 62.

Sub-process #7—Downlink Data Throughput Optimization Sub-process 70: This algorithm maintains control over allocation of downlink resources. If sufficient free downlink bandwidth is available it will assign downlink space for any SOI's DDC channel. If sufficient downlink bandwidth is not available it will compare the scoring 72 on the currently allocated downlink channels and decide if any or how many channels have lower priority. If the system is set to fully automatic it will replace the lower priority channels with higher priority. An over view picture of all the allocated DDC' with all metadata is sent down to the operators every time the picture changes. From that picture any operator can intervene and change the downlink score priorities in order to be able to check any DDC channels that not currently have enough priority to be allocated downlink space.

The final optimized data is then transmitter through the Datalink Subsystem 80 to the ground processing center or control center. Real time, fluctuating air-to-ground, or ground-to-air status messages of the downlink BW status 82 are the feedback loop to Sub-process #7 to provide closed loop control for the invention [100].

DIAGRAM REFERENCE NUMERALS

10 Whitespace Scanning (Noise Riding Threshold) subsystem
12 Scan and Measure an Instantaneous Bandwidth Region of RF Spectrum from Tuner
14 Digitize/FFT the Region into Frequency Bins
16 Noise Riding Calculations for every FFT Bin
20 Automatic Energy-of-Interest (EOI) Detection & Optimization subsystem
22 Peak Detection Calculations for every FFT Bin
24 Calculate Angle of Arrival (AoA) on every Frequency Bin
26 Peak in the Ignore List of Freq or in the Ignore List of AoA?
28 Peak Determined to be New Energy-of-Interest (EOI)
29 Calculate Center Frequency and Bandwidth (BW) of EOI
30 EOI Prioritization & Scoring subsystem
32 Calculate EOI's Digital Down Converter (DDC) Priority # By Generating a Scoring Table (User Priority Frequency List, BW, AoA, etc.)
34 DDC with Lower Priority Available To Be Tasked?
40 Automatic DDC Allocation & Storage Optimization subsystem
42 FIFO Lookback
44 Allocate DDC and Begin Collecting I/Q Stream of SOI
50 Automatic Signal-of-Interest (SOI) Algorithm
52 Digital Recorder
54 Assemble the SOI Metadata for the file Header and send the I/Q data to the recorder
60 Sub-process #6—SOI Prioritization & Scoring Sub-process
62 Calculate SOI's Downlink Priority Number Score based on factors like: (Priority Frequency List and Modulation output from Recognizer)
70 Sub-process #7—Downlink Data Throughput Optimization Sub-process
72 With Score and BW, Calculate Which SOI I/Q Streams Will be Sent Through The Downlink Based Upon A Real-Time Optimization Technique 80 Air-to-Ground Datalink Subsystem With Tracking, Telemetry, & Control 82 Real-Time, Fluctuating Air-to-Ground Data BW of Downlink FIG. 4 is presented in order to convey understanding of the method of the invention in terms of sequential steps not restricted to a particular hardware arrangement. The preferred method for optimizing the operation of Mobile SIGINT collection systems 200 commences with the system first reducing the potential data upload (i.e. between the mobile collection station and the central control station) volume by eliminating "whitespace" 202. The potential data upload volume will then be reduced by eliminating the collection of signals having frequencies that lie within blocked (or not-of-interest) ranges 204. Potential upload volume is also reduced by eliminating the collection of signals having angles of arrival within particular range(s) (e.g. to avoid collecting signals from friendly forces) 206.

The remaining signal data is considered to be Energy of Interest, and is prioritized based on bandwidth, pre-existing or real-time user-assigned priority, among other factors 208. If applicable, available DDC's may be reallocated to the EOI based on the assigned priority 210. The ongoing collection of these "Signals of Interest" is held in buffer memory 212, while simultaneously scoring and prioritizing these Signals of Interest 214. The buffered SOI data is then downlinked to the control center from the mobile collection station (e.g. aircraft) based on the real-time priority of the SOI's 216.

Each SOI package that is downlinked includes a time-stamped sequence number that is a unique identifier for the package, as well as documenting the time of transmission. Once each SOI package is received and processed, command center will uplink the sequence number to the mobile collection station 218. The air-to-ground datalink subsystem [80] uses the elapsed time between the transmission of the SOI package and the receipt of the sequence number to determine what the available data bandwidth (throughput) of the downlink is, and responsively adjusts the rate of data downlink 220. This throttling back of the downlink rate responsive to the real-time bandwidth capacity of the downlink, while the command center operator is processing the received SOI data is of extreme value when coupled with the prior-described optimization steps.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A method for optimizing the collection and re-transmission of incident electronic signals, the method comprising the steps of:
    receiving incident electronic signals at a plurality of frequencies at a mobile electronic signal processing station;
    digitizing said received electronic signals;
    splitting said digitized received signals into bins;
    eliminating said digitized signals at frequencies wherein said signal amplitude is below a pre-assigned noise threshold;
    eliminating said digitized signals at frequencies responsive to a pre-assigned frequency map;
    eliminating said digitized signals emanating from sources responsive to the spacial position of said source;
    assigning a score to each of remaining digitized signals;
    collecting said remaining digitized signals in a temporary memory buffer; and
    downlinking said collected digitized signals to a remote command center.

2. The method of claim 1, wherein said downlinking step further comprises simultaneously downlinking a time-based sequence number identifying each said collected digitized signal, said method further comprising:
    receiving said downlinked digitized signals at said remote command center;
    uplinking said time-based sequence number to said mobile electronic signal processing station.

3. The method of claim 2, further comprising the step of determining a delay time between each said sequence number downlinking and said uplinking of said same sequence number.

4. The method of claim 3, further comprising a step of adjusting the speed at which said mobile electronic signal processing station downlinks each said collected digitized signal responsive to said delay time.

5. A method for improving the performance of an electronic signal collection assembly, the assembly comprising antennae coupled to one or more frequency tuners, which is coupled to a programmable digitizer, which is coupled to a datalink transmitter, the method comprising the steps of:
    modifying said programmable digitizer so that said programmable digitizer executes the steps of:
    splitting said digitized received signals into bins;
    eliminating said digitized signals at frequencies wherein said signal amplitude is below a pre-assigned noise threshold;
    eliminating said digitized signals at frequencies responsive to a pre-assigned frequency map;
    eliminating said digitized signals emanating from sources responsive to the spacial position of said source;
    assigning a score to each of remaining digitized signals; and
    downlinking said remaining digitized signals to a remote command center responsive to said assigned score.

6. The method of claim 5, further comprising the step of modifying said datalink transmitter to collect said remaining digitized signals in a temporary memory buffer.

7. The method of claim 6, wherein:
    said downlinking step further comprises simultaneously downlinking a time-based sequence number identifying each said collected digitized signal; and
    receiving a feedback signal comprising said time-based sequence number.

8. The method of claim 7, further comprising the step of determining a delay time between each said sequence number downlinking and said uplinking of said same sequence number.

9. The method of claim 8, further comprising a step of adjusting the speed at which said mobile electronic signal processing station downlinks each said collected digitized signal responsive to said delay time.

10. An improved electronic signal collection system, comprising:
    at least one mobile electronic signal collection station;
    a command center electronic signal analysis station;
    an electronic link between said collection stations and said analysis station; and
    wherein:
    each said mobile electronic signal collection station comprises:
    an electronic signal collection subsystem;

a Whitespace Scanning (WS) subsystem, said WS subsystem configured to eliminate collected signal data at frequency bands having a signal amplitude beneath a pre-set threshold;

an Automatic Energy-of-Interest Detection and Optimization (EOIDO) subsystem configured to eliminate collected signal data responsive to pre-set frequencies and signal angles of arrival at said mobile electronic signal collection station;

an EOI Prioritization and Scoring (EOIPS) subsystem configured to score remaining said collected signal data and responsively assigning a priority to said collected signal data;

an Automatic DDC Allocation and Storage Optimization (DDCASO) subsystem configured to adjust electronic signal collection by said electronic signal collection system responsive to said assigned priority;

an Automatic Signal-of-Interest (ASOI) subsystem configured to collect said electronic signals responsive to said assigned priority and to temporarily store said collected electronic signals;

a SOI Prioritization & Scoring (SOIPS) subsystem configured to assign a score to said temporarily stored electronic signals; and a Downlink Data Throughput Optimization (DDTO) subsystem configured to downlink said temporarily stored electronic signals responsive to said assigned scores and available downlink capacity.

11. The system of claim 10, wherein said DDTO subsystem controls the rate of downlink of said temporarily stored electronic signals responsive to a delay time between a signal downlink and said downlinked signal being received at said analysis station.

12. The system of claim 11, wherein said DDTO subsystem is configured to assign a time-based sequence number to each said downlinked electronic signal, and including said time-based sequence number with each said downlinked electronic signal;

said analysis station is configured to re-transmit said time-based sequence number upon receipt to said mobile electronic signal collection station; and said delay time is determined responsive to said sequence number downlinking and the receipt of said re-transmitted sequence number by said mobile electronic signal collection station.

* * * * *